(12) United States Patent
Haynes et al.

(10) Patent No.: US 12,700,105 B2
(45) Date of Patent: Aug. 4, 2026

(54) FEATURE INSPECTION SYSTEM

(71) Applicant: Spirit AeroSystems, Inc., Wichita, KS (US)

(72) Inventors: Mark Davis Haynes, Andover, KS (US); Glen Paul Cork, Wichita, KS (US); Bharath Achyutha Rao, Wichita, KS (US); John Thomas Baumfalk-Lee, Wichita, KS (US); Matthew W. McKenna, Wichita, KS (US); Bruce E. Gabel, Wichita, KS (US); Scott Bishop, Wichita, KS (US); Gregorio Balandran, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 465 days.

(21) Appl. No.: 18/136,124

(22) Filed: Apr. 18, 2023

(65) Prior Publication Data

US 2023/0252648 A1 Aug. 10, 2023

Related U.S. Application Data

(63) Continuation of application No. 17/024,792, filed on Sep. 18, 2020, now Pat. No. 11,631,184.

(51) Int. Cl.
*G06T 7/246* (2017.01)
*B64F 5/40* (2017.01)
(Continued)

(52) U.S. Cl.
CPC ............. *G06T 7/246* (2017.01); *G01N 21/88* (2013.01); *B64F 5/40* (2017.01); *B64F 5/60* (2017.01); *G06T 2207/10032* (2013.01)

(58) Field of Classification Search
CPC ..... B64F 5/40; B64F 5/60; B64F 5/10; G01N 21/9515
See application file for complete search history.

(56) References Cited

U.S. PATENT DOCUMENTS

| | | | |
|---|---|---|---|
| 4,828,159 A | 5/1989 | Woods | |
| 5,910,894 A * | 6/1999 | Pryor | ............... G05B 19/41875 |
| | | | 700/95 |

(Continued)

FOREIGN PATENT DOCUMENTS

| | | |
|---|---|---|
| JP | 2015/000580 | 1/2015 |
| JP | 2019/219378 | 12/2019 |

(Continued)

OTHER PUBLICATIONS

Non-Final Office Action mailed Feb. 7, 2024 in related U.S. Appl. No. 17/465,967, 19 pages.

(Continued)

*Primary Examiner* — Shelby A Turner
*Assistant Examiner* — Cynthia L Davis
(74) *Attorney, Agent, or Firm* — Stinson LLP

(57) ABSTRACT

A system for inspecting features of an airframe, the system including a feature inspection device configured to measure an aspect of a first feature and a tracking subsystem configured to determine a position of the feature inspection device when the feature inspection device measures the aspect of the first feature. The system is configured to determine a position of the first feature on the airframe via the feature inspection device and the tracking subsystem, the determination of the position of the first feature being independent from the measurement of the aspect of the first feature.

19 Claims, 6 Drawing Sheets

(51) Int. Cl.
B64F 5/60     (2017.01)
G01N 21/88     (2006.01)

(56)                    References Cited

U.S. PATENT DOCUMENTS

| | | | |
|---|---|---|---|
| 7,200,256 | B2 | 4/2007 | Rose et al. |
| 7,364,043 | B2 | 4/2008 | Ong et al. |
| RE41,160 | E | 3/2010 | Gilmore et al. |
| 8,085,296 | B2 | 12/2011 | Yuguchi et al. |
| 8,676,368 | B2 | 3/2014 | Stencel et al. |
| 8,738,226 | B2 | 5/2014 | Troy et al. |
| 8,855,404 | B2 | 10/2014 | Doyle et al. |
| 8,914,046 | B2 | 12/2014 | Wetzel et al. |
| 8,930,042 | B2 | 1/2015 | Jang et al. |
| 8,983,172 | B2 | 3/2015 | Steffenson |
| 8,983,794 | B1 | 3/2015 | Motzer et al. |
| 9,187,188 | B2 | 11/2015 | Richter et al. |
| 9,221,506 | B1 | 12/2015 | Georgeson et al. |
| 9,234,904 | B2 | 1/2016 | Troy et al. |
| 9,250,213 | B1 | 2/2016 | Bossi et al. |
| 9,612,725 | B1 | 4/2017 | Senesac |
| 9,892,558 | B2 | 2/2018 | Troy et al. |
| 10,118,714 | B2 | 11/2018 | Reid et al. |
| 10,168,287 | B2 | 1/2019 | Georgeson et al. |
| 10,377,485 | B2 | 8/2019 | Claybrough |
| 10,543,598 | B2 | 1/2020 | Petty |
| 10,634,632 | B2 | 4/2020 | Troy et al. |
| 10,657,197 | B2 | 5/2020 | Sharp et al. |
| 10,712,286 | B1 | 7/2020 | Fetzer et al. |
| 10,796,486 | B2 | 10/2020 | Myers |
| 10,872,534 | B2 | 12/2020 | Clark |
| 11,238,675 | B2 | 2/2022 | Troy |
| 11,281,905 | B2 | 3/2022 | Yakimenko |
| 11,430,101 | B2 | 8/2022 | Fujita et al. |
| 11,529,777 | B2 | 12/2022 | Hafenrichter et al. |
| 11,555,693 | B2 | 1/2023 | Sweers et al. |
| 11,630,459 | B2 | 4/2023 | Georgeson et al. |
| 11,635,408 | B2 | 4/2023 | Hafenrichter et al. |
| 2003/0048459 | A1 | 3/2003 | Gooch |
| 2005/0155915 | A1 | 7/2005 | Ong et al. |
| 2010/0010660 | A1* | 1/2010 | Salour ..................... B64F 5/10 |
| | | | 700/117 |
| 2013/0132034 | A1* | 5/2013 | Wilson ................ G01M 5/0091 |
| | | | 702/183 |
| 2014/0046589 | A1* | 2/2014 | Metzler .................. G05D 1/646 |
| | | | 356/3.09 |
| 2014/0185911 | A1 | 7/2014 | Steffenson |
| 2014/0200832 | A1 | 7/2014 | Troy |
| 2015/0012171 | A1* | 1/2015 | Richter .................. G06T 7/001 |
| | | | 701/32.9 |
| 2016/0153913 | A1* | 6/2016 | Kesler ................... G01N 21/88 |
| | | | 702/184 |
| 2016/0349746 | A1 | 12/2016 | Grau |
| 2018/0114302 | A1 | 4/2018 | Sweers |
| 2018/0120196 | A1 | 5/2018 | Georgeson et al. |
| 2018/0170540 | A1 | 6/2018 | Claybrough |
| 2018/0259461 | A1* | 9/2018 | Haynes ................. G01B 17/02 |
| 2019/0130768 | A1 | 5/2019 | Clark |
| 2019/0331620 | A1 | 10/2019 | Troy et al. |
| 2019/0382135 | A1 | 12/2019 | Gonzalez et al. |
| 2020/0097721 | A1 | 3/2020 | Yakimenko |
| 2021/0174492 | A1* | 6/2021 | Karaaslan ................. G06T 7/11 |
| 2021/0232141 | A1 | 7/2021 | Georgeson |
| 2021/0237381 | A1 | 8/2021 | Hafenrichter |
| 2021/0237867 | A1 | 8/2021 | Georgeson et al. |
| 2021/0356255 | A1 | 11/2021 | Sweers |
| 2022/0024577 | A1 | 1/2022 | Stamatovski |
| 2022/0092766 | A1 | 3/2022 | Haynes et al. |

FOREIGN PATENT DOCUMENTS

| | | |
|---|---|---|
| KR | 101707865 | 2/2017 |
| KR | 101718287 | 4/2017 |
| KR | 20180029973 | 3/2018 |

OTHER PUBLICATIONS

European Search Report, Europe Patent Application No. 21870042. 5, dated Sep. 30, 2024, 11 pages, European Patent Office, Munich, Germany.
International Search Report and Written Opinion in related PCT Application PCT/US2021/050163 mailed Dec. 24, 2021, 11 pages.
International Search Report and Written Opinion in related PCT Application PCT/US2022/042491 mailed Dec. 21, 2022, 10 pages.

\* cited by examiner

FEATURE INSPECTION SYSTEM

RELATED APPLICATIONS

This continuation patent application claims priority benefit to earlier-filed U.S. patent application Ser. No. 17/024, 792, titled "FEATURE INSPECTION SYSTEM", filed Sep. 18, 2020. The earlier-filed patent application is hereby incorporated by reference, in its entirety, into the current patent application.

BACKGROUND

Aircraft airframes include thousands of features that must be examined to ensure they conform to strict engineering specifications. Such examinations often involve more than one step. For example, fasteners are initially inspected via human tactile observation, which can be inconsistent between inspectors. Fasteners flagged based on tactile observation undergo final pass/fail measurements via a depth indicator. This two-step process is inefficient and ineffective because many flagged fasteners pass final pass/fail measurements, and many non-flagged fasteners are later discovered to be non-conforming.

Digital inspection devices can be used to scan fasteners, but scan data is difficult to process post-scan. For example, it is difficult to associate fastener measurements with the appropriate fastener position on the airframe. Some digital inspection devices measure fastener head heights in terms of the inspection device's position in space, thereby associating fastener head height measurements with corresponding fastener positions, but this produces low quality fastener head height measurements and is not very versatile.

SUMMARY

Embodiments of the present invention solve the above-mentioned problems and other related problems and provide a distinct advance in the art of feature inspection systems. More particularly, the present invention provides a feature inspection system that measures aspects of airframe features and independently determines positions and orientations of the airframe features.

An embodiment of the invention is a system for inspecting fasteners of an airframe. The feature inspection system broadly comprises a number of feature inspection devices, a tracking subsystem, and a number of computing devices.

The feature inspection devices are substantially similar, and each is configured to scan a number of fasteners. Each feature inspection device includes a frame, a scanner, a number of tracking targets, and an augmented reality projector.

The frame includes handles and contact pads. The frame spaces the scanner from the airframe to position the scanner in range of targeted fasteners.

The handles allow the user to position the feature inspection device against the airframe and hold the feature inspection device in position while the scanner scans the fasteners. The handles allow the user to steady the feature inspection device when the feature inspection device is positioned on top of the airframe and support the feature inspection device when the feature inspection device is positioned against a side or bottom of the airframe.

The contact pads contact the airframe without scratching or damaging the airframe. To that end, the contact pads may be a resilient rubber, felt, or any other suitable materials. On the other hand, the contact pads are rigid enough for the scanner to generate accurate readings.

The scanner may be a three-dimensional surface inspection sensor, an optical sensor, a camera, or any other suitable scanning component. The scanner may be contactless or a tactile sensor.

The tracking targets are passive or active targets positioned on specific locations on the frame. The tracking targets provide reference points for the tracking subsystem to determine a position and orientation of the feature inspection device.

The augmented reality projector may include user inputs, a touchscreen, a display, status indicators, and the like. The augmented reality projector provides scanning readouts, alignment information, feature data, and other information to the user. The augmented reality projector may display the above information directly on the airframe.

The tracking subsystem includes a number of cameras and a tracking computer. The tracking subsystem ensures spatial tracking of the feature inspection device (and hence the fasteners) relative to an aircraft coordinate system that moves with the airframe.

The cameras are spaced apart from each other near the airframe such that the entire airframe is visible from as many cameras as possible. To that end, the cameras may be placed in several locations near the airframe on scaffolding so that the feature inspection device is in view of at least one of the cameras during feature scanning.

The tracking computer may include a processor, a memory, user inputs, a display, and the like. The tracking computer may also include circuit boards and/or other electronic components such as a transceiver or external connection for communicating with other computing devices of the feature inspection system. The tracking computer determines the position and orientation of the feature inspection device and the airframe via the cameras.

The computing devices include a master computing device, a number of client computing devices, and a number of remote/networked computing devices. The computing devices may be connected to each other via a wired or wireless communication network.

The master computing device includes a processor, a memory, a communication element, a number of inputs, a display, and/or other computing components for managing the client computing devices and remote computing devices. To that end, the master computing device may be a hub in wired or wireless communication with the above computing devices.

The client computing devices are front-end computing devices communicatively linked to the master computing device and may be desktop computers, laptop computers, tablets, handheld computing devices, kiosks, and the like. The client computing devices may include human machine interfaces HMIs used directly by inspectors for inputting data into and reviewing data from the feature inspection system. For example, the HMIs may be a graphical representation of the airframe including the fasteners displayed on an interactive touch display board, a computer screen, or the like. The HMIs may interact with many different feature inspection devices and work cells such that the feature inspection system is scalable. The HMIs may also be used for fastener map management.

The remote computing devices are back-end computing devices communicatively linked to the master computing device and may be desktop computers, servers, mainframes, data repositories, and the like. The remote computing devices store and analyze data collected by the tracking subsystem and the client computing devices.

In use, one of the feature inspection devices may be held against the airframe such that a set of features is in range of and/or framed by the scanner. The scanner may then be activated to capture measurement data or imagery of the features. For example, the scanner may obtain a scan image and a raw image of a number of fasteners.

The tracking subsystem determines a position and orientation of the feature inspection device relative to the airframe when the scanner is activated. Specifically, the tracking subsystem detects the tracking targets on the feature inspection device via the cameras.

The feature inspection device or one of the computing devices may then process and/or store the captured measurement data. The raw images obtained by the scanner may include relevant text or visual information near the features, which may be useful for later review or contextualizing feature data. The system also determines a position and orientation of each inspected fastener based on the position and orientation of the feature inspection device when the fastener is scanned. This is done independently of the scan itself.

The augmented reality projector then displays or projects onto the airframe information regarding the current scan. For example, the augmented reality projector may indicate which features have been scanned and may present measurement results of the scan.

Head height measurement data and other measurement data may be associated with corresponding fasteners in a fastener map. This data may be reviewed in the fastener map via one of the HMIs or one of the client computing devices.

Final scanning and tracking results from the feature inspection device may be stored via the remote computing devices. The remote computing devices provide permanent enterprise databasing of the measurement results and generation of static reports per each line unit.

The feature inspection system provides several advantages. For example, the feature inspection system automates feature inspection for large aerostructure assemblies. In one embodiment, the feature inspection system provides real time, continuous, precision measurement and recording of fastener head heights and independently determines fastener positions and fastener orientations in an aircraft coordinate reference frame. Measurement data and positions and orientations of the fasteners on the airframe are digitally logged for fastener reworking during manufacturing and for record-keeping throughout the life of the aircraft.

The feature inspection system generates automated intelligent rework plans that do minimal damage at minimal cost to achieve a conforming product. The feature inspection system performs analytical studies to predict and determine areas of concerns before issues occur. To that end, the feature inspection system may also track fabrication tools to determine correlation/causation of mechanic behavior and non-conforming product in a sustained continuous real-time production environment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
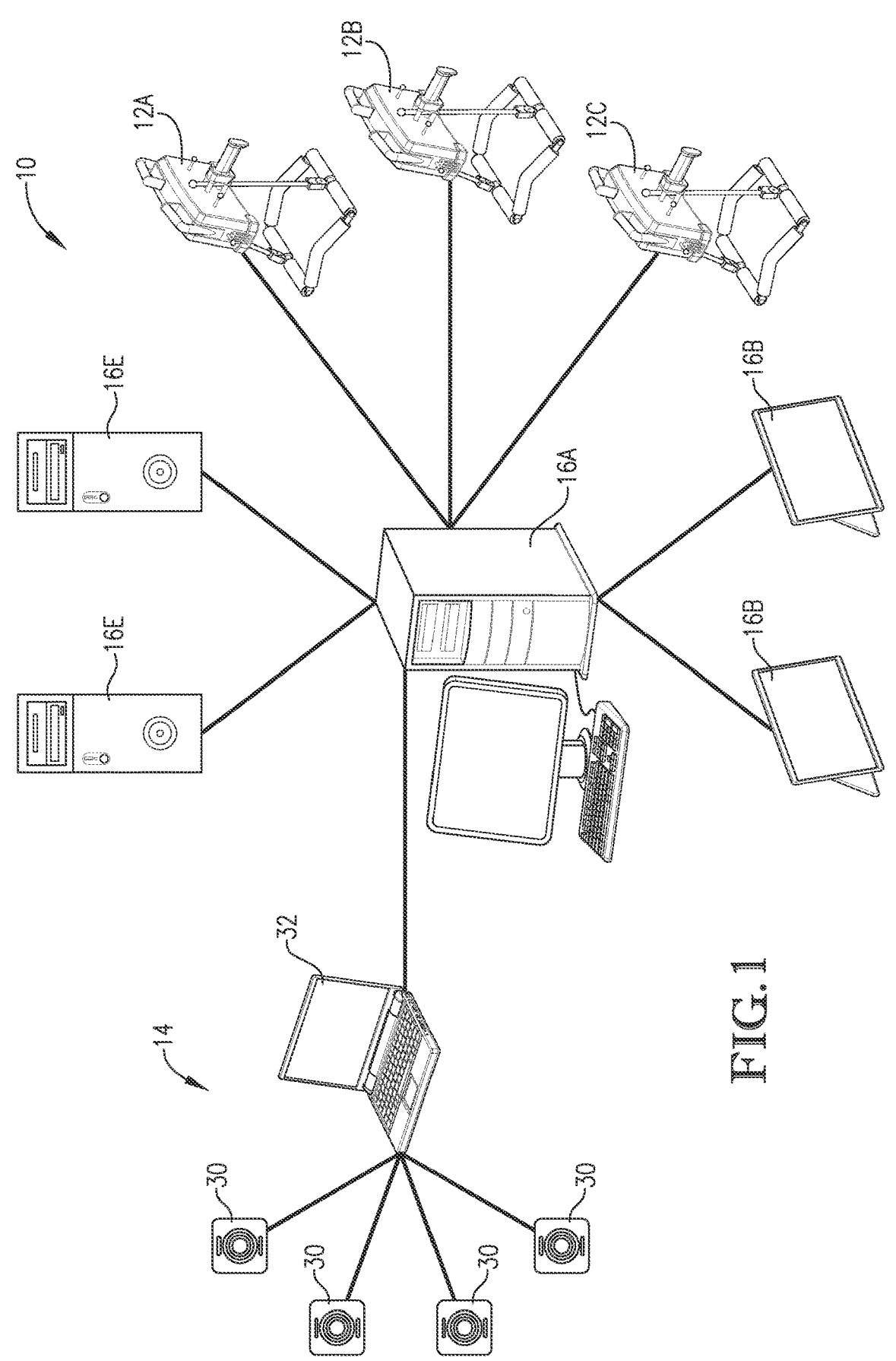
FIG. 1 is a schematic diagram of a feature inspection system constructed in accordance with an embodiment of the invention.
Figure 2:
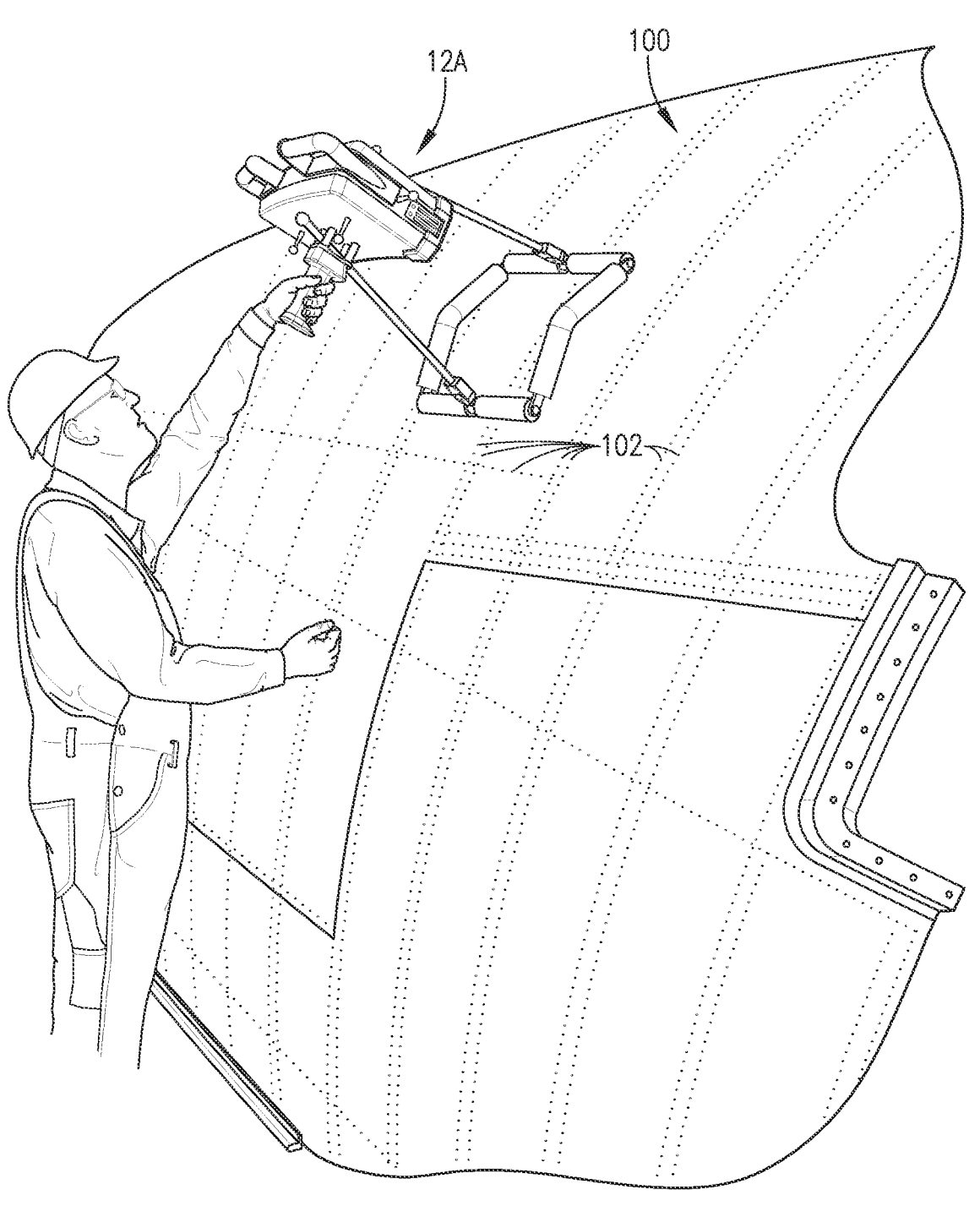
FIG. 2 is an environmental view of a feature inspection device of the feature inspection system of FIG. 1 being used on an airframe.
Figure 3:
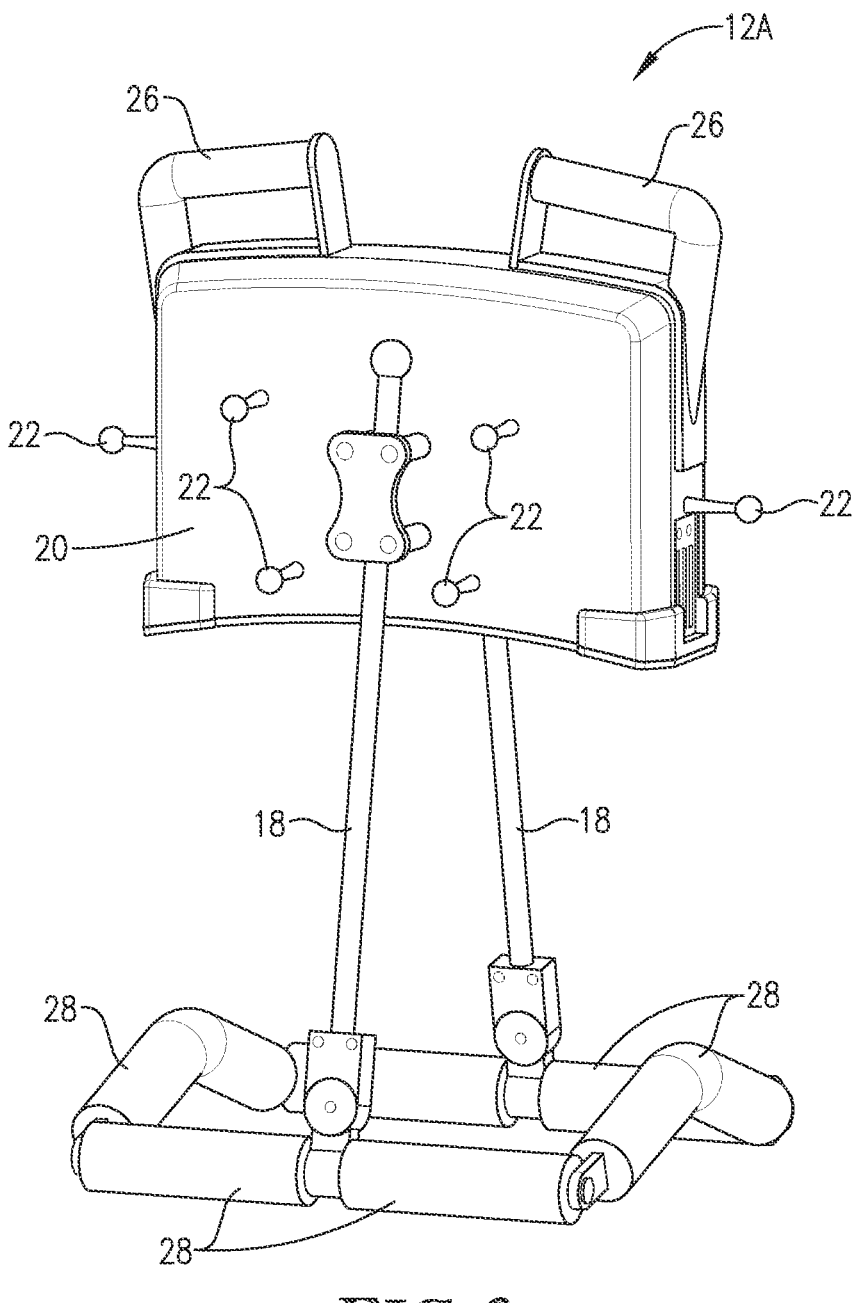
FIG. 3 is an enlarged perspective view of the feature inspection device of FIG. 2.
Figure 4:
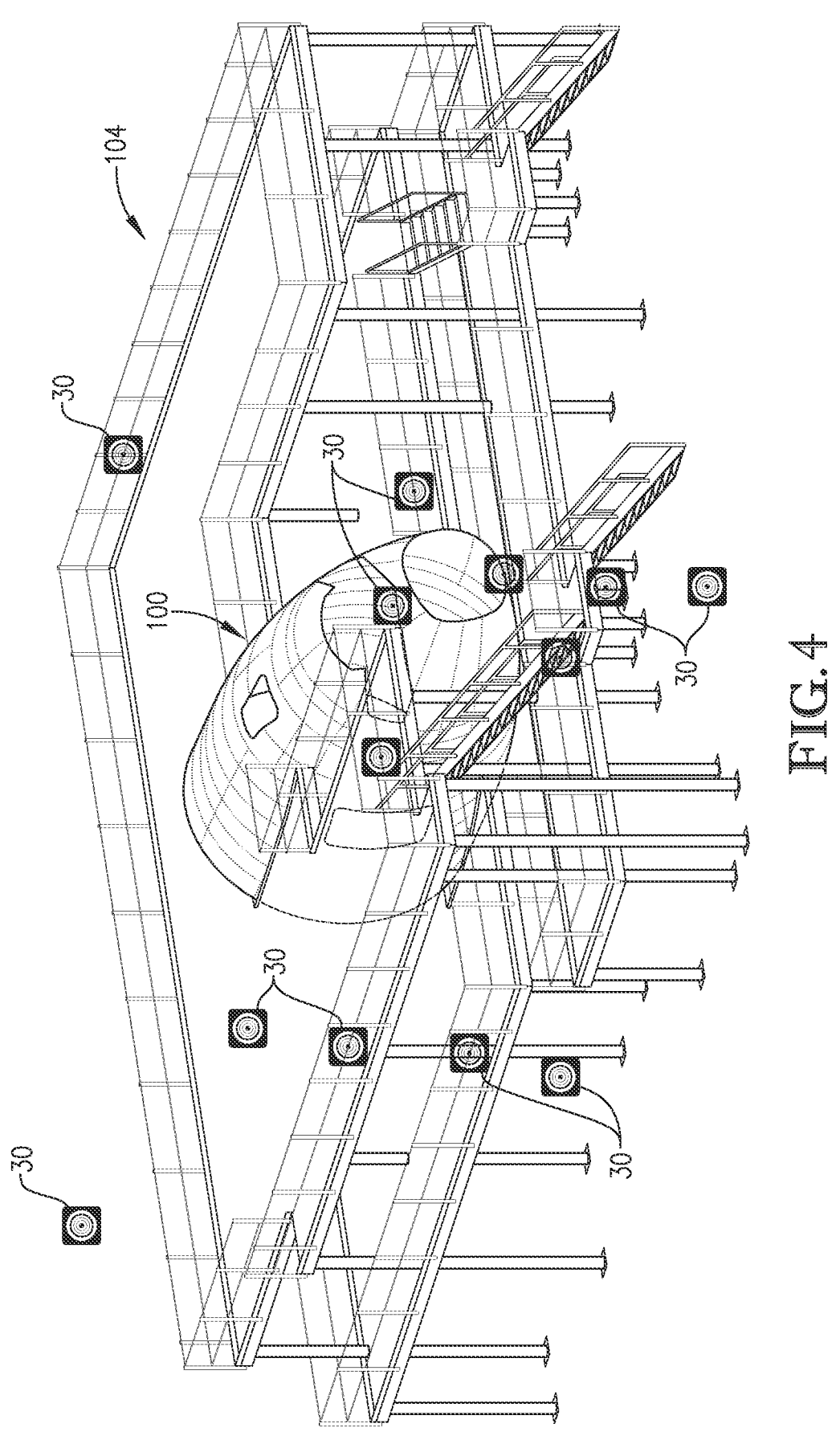
FIG. 4 is an environmental view of certain components of the feature inspection system of FIG. 1.
Figure 5:
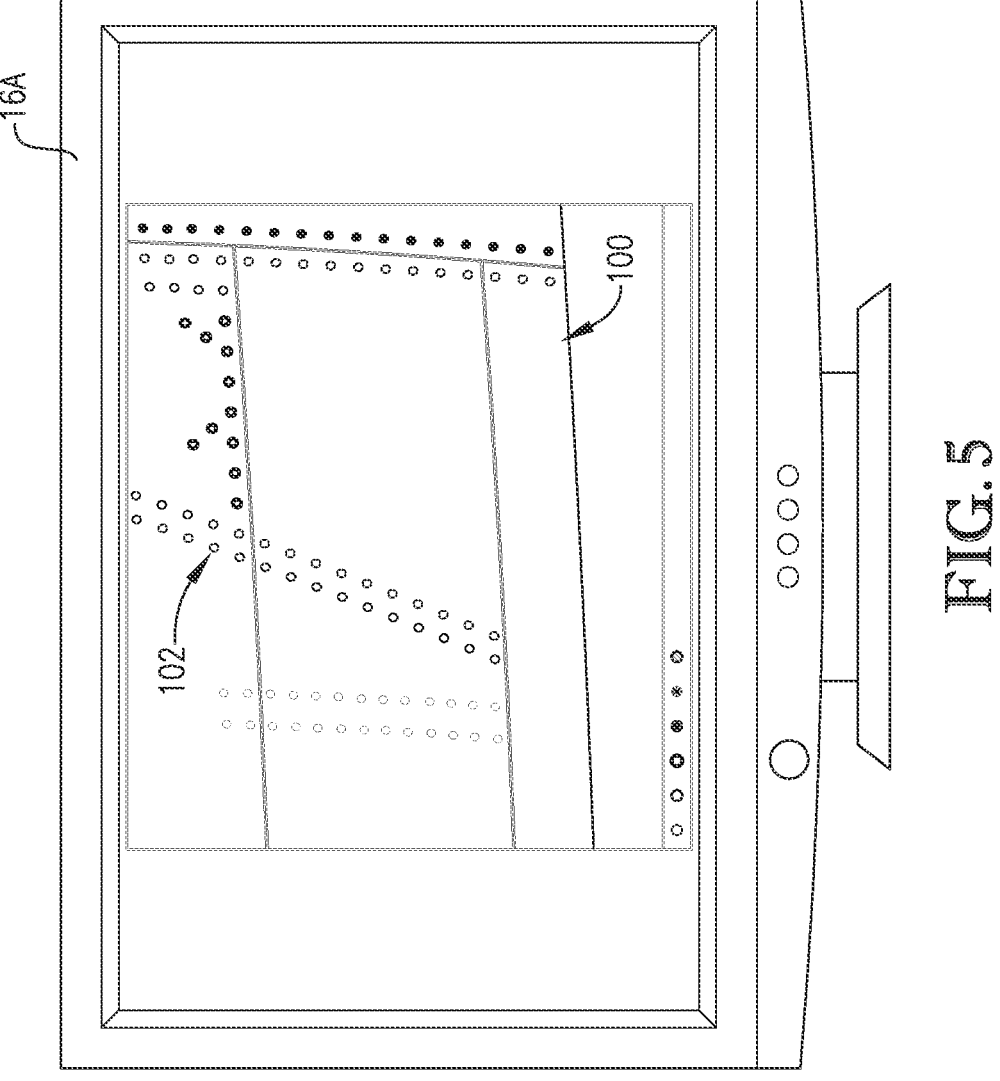
FIG. 5 is a screen view of a graphical user interface of the feature inspection system of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Turning to FIGS. 1-5, a feature inspection system 10 constructed in accordance with an embodiment of the invention is illustrated. The feature inspection system 10 is described in terms of airframe fastener head height inspection, but the feature inspection system 10 may be used for inspecting other aircraft features and monitoring other aspects of aircraft fabrication.

The feature inspection system 10 broadly comprises a plurality of feature inspection devices 12A-C, a tracking subsystem 14, and a plurality of computing devices 16A-E. The feature inspection system 10 may include additional inspection devices, tracking components, and computing devices so that the feature inspection system 10 is scalable, replicable, and adaptable to various airframe fabrication programs and other construction programs.

The feature inspection devices 12A-C are substantially similar so only feature inspection device 12A will be described in detail. Feature inspection device 12A includes a frame 18, a scanner 20, a plurality of tracking targets 22, and an augmented reality projector. Feature inspection device 12A may be an 8tree® brand scanning device, an OTIS scanning device, a LOTIS scanning device, a depth indicator, an isoscope, or any other suitable scanning device.

The frame 18 may include handles 26 and contact pads 28. The frame 18 spaces the scanner 20 from the airframe 100 so that targeted fasteners 102 are in range of the scanner 20.

The handles 26 may include suitcase grips, a pistol grip, or any other suitable grasping features. The handles 26 allow the user to position the feature inspection device 12A against the airframe 100 and hold the feature inspection device 12A in position while the scanner 20 scans the fasteners 102.

The contact pads 28 contact the airframe 100 without scratching or damaging the airframe 100. To that end, the contact pads 28 may be a resilient rubber, felt, or any other suitable materials. On the other hand, the contact pads 28 are rigid enough for the scanner 20 to generate accurate readings.

The scanner 20 may be a three-dimensional surface inspection sensor, a camera, an optical sensor, or any other suitable scanning component. The scanner 20 may be contactless or may be a tactile sensor.

The tracking targets 22 may be passive or active targets positioned on the frame 18 or any other suitable detectable elements. The tracking targets 22 provide reference points for determining a position and orientation of the feature inspection device 12A.

The augmented reality projector may include user inputs, a touchscreen, a display, status indicators, and the like. The augmented reality projector provides scanning readouts, alignment information, feature data, and other information to the user. The augmented reality projector may display the above information on the airframe 100.

The tracking subsystem 14 includes a plurality of cameras 30 and a tracking computer 32. The tracking subsystem 14 ensures tracking of the feature inspection device 12A (and hence the fasteners 102) relative to an aircraft coordinate system that moves with the airframe 100. The tracking subsystem 14 may use OptiTrack, ART, or Vicon system, or any other suitable three-dimensional positional tracking system.

The cameras 30 are spaced apart from each other near the airframe 100. The cameras 30 may be placed in several locations near the airframe 100 on scaffolding 104 so that the feature inspection device 12A is in view of at least one of the cameras 30. The cameras 30 may have protective housings and mounts to avoid accidentally disturbing the cameras 30. The cameras 30 provide information about the position and orientation of the feature inspection device 12A and the airframe 100.

The tracking computer 32 may include a processor, a memory, user inputs, a display, and the like. The tracking computer 32 may also include circuit boards and/or other electronic components such as a transceiver or external connection for communicating with other computing devices of the feature inspection system 10. The tracking computer 32 determines the position and orientation of the feature inspection device 12A and the airframe 100 via the cameras 30.

The tracking subsystem 14 may be a macro area precision position system (MAPPS) camera network system and may be compatible with cross measurement from other metrology devices. MAPPS achieves precise positional tracking of objects in a dynamic space in real time via a plurality of cameras such as cameras 30. The tracking subsystem 14 uses retroreflective targets (such as tracking targets 22) and markers that can be interchanged with shank target mounts utilized in many tooling and floor-mounted assembly jigs. Photogrammetry surveys of visible targets enables rigid body creation and motion tracking with aligned point sets coming from tooling reference locations.

The computing devices 16A-E include a master computing device 16A, a plurality of client computing devices 16B,C, and a plurality of remote/networked computing devices 16D,E. The computing devices 16A-E may be connected to each other via a wired or wireless communication network.

The master computing device 16A may include a processor, a memory, a plurality of inputs, and a display. The master computing device 16A may also include circuit boards and/or other electronic components such as a transceiver or external connection for communicating with external computing systems.

The processor may implement aspects of the present invention with one or more computer programs stored in or on computer-readable medium residing on or accessible by the processor. Each computer program preferably comprises an ordered listing of executable instructions for implementing logical functions in the processor. Each computer program can be embodied in any non-transitory computer-readable medium, such as the memory (described below), for use by or in connection with an instruction execution system, apparatus, or device, such as a computer-based system, processor-containing system, or other system that can fetch the instructions from the instruction execution system, apparatus, or device, and execute the instructions.

The memory may be any computer-readable non-transitory medium that can store the program for use by or in connection with the instruction execution system, apparatus, or device. The computer-readable medium can be, for example, but not limited to, an electronic, magnetic, optical, electro-magnetic, infrared, or semi-conductor system, apparatus, or device. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The inputs may comprise a keyboard, mouse, trackball, touchscreen, buttons, dials, virtual inputs, and/or a virtual reality simulator. The inputs allow a user to activate and control components of the feature inspection system 10.

The display may present virtual inputs, data spreadsheets and data tables, graphical data representations, computer models of the airframe 100, fastener maps, and other information. The display may be a touchscreen, an LCD screen, an LED screen, and the like.

The client computing devices 16B,C are front-end computing devices linked to the master computing device 16A and may be desktop computers, laptop computers, tablets, handheld computing devices, kiosks, and the like. The client computing devices 16B,C may include human machine interfaces HMIs used directly by inspectors for inputting data into and reviewing data from the feature inspection system 10. For example, the HMIs may be a graphical representation of the airframe 100 including the fasteners 102 displayed on an interactive touch display board, a computer screen, or the like. The HMIs may interact with many different feature inspection devices 12A-C and work cells such that the feature inspection system 10 is scalable. The HMIs may also be used for fastener map management. The HMIs may also visually indicate features that do not meet manufacturing specifications and should be reworked.

The remote computing devices 16D,E are back-end computing devices linked to the master computing device and may be desktop computers, servers, mainframes, data repositories, and the like. The remote computing devices 16D,E may store and analyze data collected by the tracking subsystem 14 and the client computing devices 16D,E.

Figure 6:
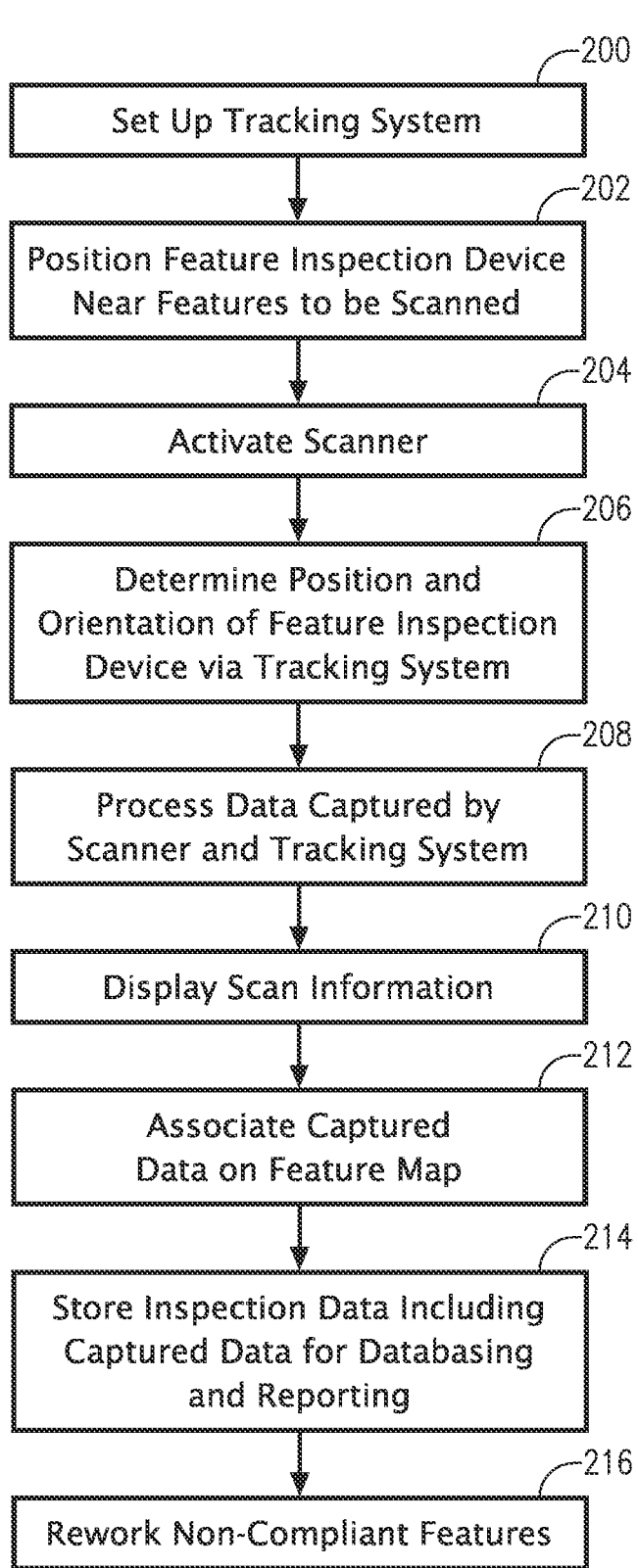
FIG. 6 is a flow diagram of method steps for inspecting features via the feature inspection system of FIG. 1 in accordance with an embodiment of the invention.

Turning to FIG. 6, use of the feature inspection system 10 will now be described in more detail. First, the cameras 30 of the tracking subsystem 14 may be positioned near the airframe 100 and calibrated, as shown in block 200. For example, the cameras 30 may be installed directly onto scaffolding surrounding the airframe 100. The cameras 30 may be rigidly constrained for reliable data acquisition. To that end, the cameras 30 may be clamped, mounted, or magnetically held to the scaffolding. Unprotected cameras risk being bumped and/or moved by workers passing through the work environment.

The feature inspection device 12A may then be positioned against the airframe 100 such that a set of features (or a single feature) is in range and/or framed by the scanner 20, as shown in block 202. To that end, the contact pads 28 of the frame 18 may contact the airframe 100 such that the scanner 20 faces the features. The feature inspection device 12A should be in sight of a maximum number, and at least one, of the cameras 30.

The scanner 20 may then be activated so that the scanner 20 captures data or imagery of the features, as shown in block 204. In one embodiment, the scanner 20 obtains a scan image and a raw image of the fasteners. The scanner 20 may need to be held steady for approximately two seconds during data capture. The feature inspection device 12A may indicate a quality of the scan of the features so that they may be rescanned if the scan is poor.

The tracking subsystem 14 determines a position and orientation of the feature inspection device 12A relative to the airframe 100 when the scanner 20 is activated, as shown in block 206. Specifically, the tracking subsystem 14 detects the tracking targets 22 on the feature inspection device 12A via the cameras 30. The tracking subsystem 14 also determines a position of the airframe 100 to set an aircraft coordinate system. In this way, the system 10 determines positions of the features relative to the airframe 100 (via the position and orientation of the feature inspection device 12A) so that the positions of the features can be expressed according to the aircraft coordinate reference frame of the airframe 100.

The feature inspection device 12A or one of the computing devices 16A-E may then process and/or store the captured data, as shown in block 208. This may be completed virtually instantaneously or at most within five seconds from activating the scanner 20. In one embodiment, up to thirty fastener head heights may be scanned. Storing a raw image of the fasteners may be useful if there is relevant text or visual information on inspection tape or the TPC pertinent to the inspected fasteners.

The augmented reality projector may then display or project onto the airframe 100 information regarding the current scan, as shown in block 210. For example, the augmented reality projector may indicate which features have been scanned and may present measurement results of the scan. Alternatively, another interface may display the information regarding the current scan.

In this way, the augmented reality projector (or another interface) enables real time feedback to the tracking and logging of fastener positions and orientations in the aircraft coordinate reference frame. Specifically, the augmented reality projector displays the real time positions and/or orientations of the feature inspection device 12A (and hence the scanner 20) and the measured fasteners for the user's review. The augmented reality projector allows the user to query the fastener head measurement results. If one of the measurements is erroneous, the user may delete the erroneous measurement and/or the entire scan.

The position and orientation of the fasteners may be added to a fastener map (or more generally, a feature map) via one of the computing devices 16A-E, as shown in block 212. Fastener maps are a list of all fasteners on an airframe with their respective locations in the airframe and associated engineering specifications. Which allows for matching scanned fasteners to associated engineering specifications and determining if a fastener's flushness is within acceptable tolerance. Fastener maps also allow for updating engineering specifications to reflect engineering changes in fastener locations and specifications. If a fastener map does not exist, the feature inspection system 10 can be used to reverse engineer fastener locations and create a fastener map that the feature inspection system 10 can use for fastener inspection and tracking.

Engineering data may be loaded for multiple fastener map contexts. The fastener map contexts are tracked and any data requests are routed to the appropriate fastener instance. Fastener maps allow for a reference engineering defined fastener to be matched to a set of coordinates in space from scan data. Fastener maps also provide auxiliary services such as obtaining a spreadsheet of all fasteners, fastener count, and other data.

Fastener maps may include a computer model with virtual representations of an aircraft skin and its fasteners. The computer model enables a user to easily visualize fasteners, fastener locations, and information about the fasteners such as fastener types and tolerances. The feature inspection system 10 may use this information for cross referencing scanned results. Fastener maps may be interactive such that information about a fastener may be viewed upon clicking, touching, or otherwise selecting the fastener's virtual representation. Head height measurement data and other measurement data may be associated with the fasteners in the fastener map. This data may be reviewed in the fastener map via one of the HMIs or one of the client computing devices 16B,C. Color schemes may be used to indicate acceptable fasteners versus unacceptable fasteners. Final scanning and tracking results from the feature inspection device 12A may be stored via the remote computing devices 16D,E, as shown in block 214. The remote computing devices 16D,E provide permanent enterprise databasing of the measurement results and generation of static reports per each line unit.

Fasteners found to be non-compliant may then be reworked, as shown in block 216. For example, non-compliant fasteners may be adjusted until compliant or replaced with compliant fasteners.

The feature inspection system 10 provides several advantages. For example, the feature inspection system 10 automates airframe feature inspection. In one embodiment, the feature inspection system 10 provides real time, continuous, precision measurement and recording of fastener head heights and independently determines fastener positions and orientations in an aircraft coordinate reference frame. Inspected fastener identification data, measurement data, and positions and orientations of fasteners on the airframe can be digitally logged for fastener reworking during manufacturing and for recordkeeping throughout the life of the aircraft.

The feature inspection system 10 generates automated intelligent rework plans that do minimal damage and are achieved at minimal cost to achieve a conforming product. The feature inspection system 10 performs analytical studies to predict and determine areas of concerns before issues occur. For example, the feature inspection system 10 may analyze measurements and positions of the features to determine trends of non-conformance.

Scanned features are automatically associated to their nominal engineering definition in a feature map. Feature measurement results can be reviewed at any time during scanning. All historical line units are reviewable for root cause corrective action and process improvement development.

The feature inspection system 10 can be used with different inspection devices besides feature inspection devices 12A-C. The cameras 30 ensure measurements and positional/orientation data can be obtained any place around the entire airframe. The feature inspection system 10 scales well for the number and type of feature inspections involved in aircraft production and the number of inspectors using the feature inspection system 10.

The feature inspection system 10 uses photogrammetry motion tracking to achieve high level three-dimensional indoor feature position and orientation mapping and aircraft skin quality defect locations in a factory environment. The photogrammetry motion tracking may use existing tooling ball locators that exist on all FAJs and tools for aerospace manufacturing for aligning tools and features into the aircraft coordinate reference frame. The feature inspection system 10 may combine photogrammetry motion tracking and traditional aerospace photogrammetry to create reference networks of tracked targets in the aircraft coordinate reference frame.

The feature inspection system 10 has a system architecture that allows any number of feature inspection devices, any number of user interfaces, and any number of aircraft products to all be tracked and seamlessly integrated with any number of photogrammetry tracking systems. That is, the system architecture allows the number of user interfaces, the number of feature inspection devices, and the number of tracked aircraft sub-assemblies to be independent from each other. The system architecture may be built on a modular programming architecture that makes the feature inspection system 10 highly modular for alternate scanners and applications and streamlines the integration of fully automated robotic or cobot based applications.

The system architecture accommodates many different types of measurement devices including 8tree® brand scanners, optical topographic inspection system (OTIS) described in US patent application publication number US-2018-0259461, LED optical topographic inspection systems such as LOTIS, depth indicators, and isoscopes. The system architecture also enables tracking non-measurement fabrication tools (and aspects thereof) such as drills, torque guns, riveting guns, hand sanders, DA sanders, and the like. For example, the feature inspection system 10 may determine a position, an orientation, an output, and other data of a fabrication tool when the fabrication tool is used. The feature inspection system 10 may analyze the above data to determine trends of non-conforming usage of the fabrication tool and correlation/causation of mechanic behavior and non-conforming product in a sustained continuous real-time production environment.

The feature inspection devices 12A-C achieve repeatability with sufficient measurement results and cycle times for use during production. The feature inspection devices 12A-C achieve reliable tracking in a factory environment via photogrammetry motion tracking with settings and output conditioned to achieve accurate and repeatable measurements conforming to inspection requirements. Real-time tracking of the motion capture cameras 30 provide extended reality feedback for displaying scanned results and work instructions.

ADDITIONAL CONSIDERATIONS

The description and drawings are illustrative and are not to be construed as limiting. Numerous specific details are described to provide a thorough understanding. However, in certain instances, well-known or conventional details are not described in order to avoid obscuring the description. References to one embodiment or an embodiment in the present disclosure are not necessarily references to the same embodiment; and, such references mean at least one.

The use of headings herein is merely provided for ease of reference, and shall not be interpreted in any way to limit this disclosure or the following claims.

References to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not for other embodiments. Unless excluded by explicit description and/or apparent incompatibility, any combination of various features described in this description is also included here.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A feature inspection system, said feature inspection system comprising:

a computing device;

a handheld feature inspection device configured for conducting discrete scans of localized areas of a workpiece to generate measurement data including fastener head height data for each fastener within the localized area of each scan, the handheld feature inspection device configured to be positioned by a human operator in relation to the workpiece, the handheld feature inspection device including a plurality of retroreflective tracking targets, and said handheld feature inspection device transmits said measurement data to said computing device;

a tracking subsystem comprising a plurality of motion capture cameras positioned around the workpiece, said tracking subsystem determines a position of said workpiece to generate a workpiece coordinate system, said tracking subsystem determines a position and an orientation of said handheld feature inspection device within said workpiece coordinate system relative to said workpiece by tracking said plurality of retroreflective tracking targets via said plurality of motion capture cameras, wherein said position of said workpiece, said workpiece coordinate system, and said position and said orientation of said handheld feature inspection device are transmitted to said computing device;

wherein said computing device is configured to:

access a feature map comprising a plurality of predefined feature locations within said workpiece coordinate system, wherein each predefined feature location is associated with an engineering specification;

identify one of the plurality of predefined features based on the determined position and orientation of the handheld feature inspection device, wherein said identifying is performed independently of the measurement data generated by the handheld feature inspection device because said identifying is based on said tracking of said plurality of retroreflective tracking targets by said plurality of motion capture cameras rather than on analysis of said measurement data;

compare the measurement data from the handheld feature inspection device with the engineering specification associated with the identified feature to determine a conformance status; and generate, on a real-time interface, a graphical representation indicating the conformance status of the identified feature.

2. The feature inspection system of claim 1, wherein said handheld feature inspection device captures data or imagery of said at least one feature, wherein said data or imagery of said at least one feature is processed by said feature inspection device or said computing device to generate said measurement data relating to said at least one feature.

3. The feature inspection system of claim 1, wherein said handheld feature inspection device is one of an OTIS scanning device, a LOTIS scanning device, a depth indicator, or an isoscope.

4. The feature inspection system of claim 1, wherein said handheld feature inspection device includes a scanner, said scanner is one of a three-dimensional surface inspection sensor, a camera, or an optical sensor.

5. The feature inspection system of claim 1, wherein said handheld feature inspection device includes a scanner, said scanner is a contactless sensor or a tactile sensor.

6. The feature inspection system of claim 1, further comprising another feature inspection device for performing a different measuring function.

7. The feature inspection system of claim 1, wherein the real-time interface is presented on an augmented reality projector operatively connected to the handheld feature inspection device.

8. The feature inspection system of claim 7, wherein the augmented reality projector is configured to display the graphical representation indicating the conformance status directly onto the workpiece.

9. The feature inspection system of claim 1, wherein the tracking subsystem generates the workpiece coordinate system by tracking a plurality of reference targets positioned on a floor-mounted assembly jig holding the workpiece.

10. The feature inspection system of claim 9, wherein the tracking subsystem generates the workpiece coordinate system by performing a photogrammetry survey of the plurality of reference targets to create aligned point sets from tooling reference locations.

11. The feature inspection system of claim 9, wherein the plurality of reference targets comprise tooling ball locators.

12. The feature inspection system of claim 1, wherein the handheld feature inspection device comprises a contact pad configured to contact the workpiece during each discrete scan of a localized area.

13. The feature inspection system of claim 1, wherein the handheld feature inspection device is configured to conduct discrete scans of localized areas of the workpiece containing thirty fasteners or less and wherein the workpiece includes thousands of fasteners.

14. A feature inspection system, said feature inspection system comprising:

a computing device;

a tracking subsystem comprising a plurality of motion capture cameras positioned around a workpiece, said tracking subsystem determines a position of the workpiece to generate a workpiece coordinate system, wherein said position of said workpiece and said workpiece coordinate system are transmitted to said computing device;

at least one tool having a plurality of retroreflective tracking targets connected thereto, wherein said retroreflective tracking targets are utilized by said tracking subsystem to determine a position and orientation of said at least one tool within said workpiece coordinate system by tracking said plurality of retroreflective tracking targets via said plurality of motion capture cameras, and wherein said at least one tool includes a handheld feature inspection device configured for conducting discrete scans of localized areas of said workpiece to generate measurement data including fastener head height data for each fastener within the localized area of each scan, the handheld feature inspection device configured to be positioned by a human operator in relation to the workpiece;

wherein said computing device processes said position and orientation of said least one tool, and, wherein the at least one tool is the handheld feature inspection device, is further configured to:

access a feature map comprising a plurality of predefined feature locations within said workpiece coordinate system, wherein each predefined feature location is associated with an engineering specification;

identify one of the plurality of predefined features based on the determined position and orientation of the handheld feature inspection device, wherein said identifying is performed independently of the measurement data generated by the handheld feature inspection device because said identifying is based on said tracking of said plurality of retroreflective tracking targets by said plurality of motion capture cameras rather than on analysis of said measurement data;

compare the measurement data from the handheld feature inspection device with the engineering specification associated with the identified feature to determine a conformance status; and generate, on a real-time interface, a graphical representation indicating the conformance status of the identified feature, wherein said position and orientation of each of said at least one tool is mapped within said workpiece coordinate system in a real-time manner.

15. The feature inspection system of claim 14 further comprising an augmented reality projector operatively connected to said computing device, wherein said augmented reality projector provides a user interface for displaying at least one of said workpiece orientation system, said workpiece within said workpiece orientation system, said position and orientation of said at least one tool within said workpiece orientation system, measurement data from said feature inspection device.

16. A feature inspection system, said feature inspection system comprising:

a computing device comprising a plurality of computers;

a handheld feature inspection device configured for conducting discrete scans of localized areas of a workpiece to generate measurement data including fastener head height data for each fastener within the localized area of each scan, the handheld feature inspection device configured to be positioned by a human operator against said workpiece, wherein the handheld feature inspection device includes a plurality of retroreflective tracking targets relating to said at least one feature, and said handheld feature inspection device transmits said measurement data to one of said computers;

a tracking subsystem comprising a plurality of motion capture cameras positioned around said workpiece, said tracking subsystem determines a position of said workpiece to generate a workpiece coordinate system, said tracking subsystem determines a position and an orientation of said handheld feature inspection device within said workpiece coordinate system relative to said workpiece by tracking said plurality of retroreflective tracking targets via said plurality of motion capture cameras, wherein said position of said workpiece, said workpiece coordinate system, and said position and said orientation of said handheld feature inspection device are transmitted to said computing device; and an augmented reality projector operatively connected to said computing device;

wherein said computing device is configured to:

access a feature map comprising a plurality of predefined feature locations within said workpiece coordinate system, wherein each predefined feature location is associated with an engineering specification;

identify one of the plurality of predefined features based on the determined position and orientation of the handheld feature inspection device, wherein said identifying is performed independently of the measurement data generated by the handheld feature inspection device because said identifying is based on said tracking of said plurality of retroreflective tracking targets by said plurality of motion capture cameras rather than on analysis of said measurement data;

compare the measurement data from the handheld feature inspection device with the engineering specification associated with the identified feature to determine a conformance status; and generate, on the augmented reality projector, a real-time graphical representation indicating the conformance status of the identified feature.

17. The feature inspection system of claim 16, wherein said handheld feature inspection device captures data or imagery of said at least one feature, wherein said data or imagery of said at least one feature is processed by said handheld feature inspection device or said computing device to generate said measurement data relating to said at least one feature.

18. The feature inspection system of claim 16, wherein said handheld feature inspection device includes a scanner, said scanner is one of a three-dimensional surface inspection sensor, a camera, or an optical sensor.

19. The feature inspection system of claim 16, further comprising another feature inspection device configured to perform a separate measuring function.

* * * * *